N. C. Sanford,
Wood Augur,
№ 36,534. Patented Sep. 23, 1862.
Fig. 1.
Fig. 3.
Fig. 2.
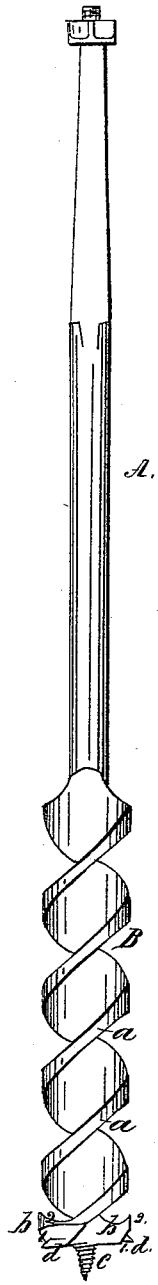
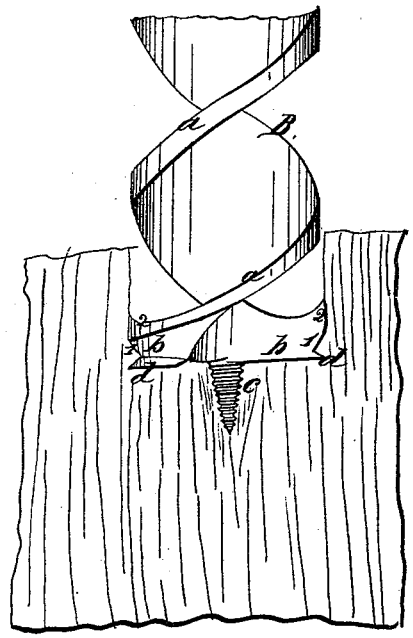
Witnesses:
JW Coombs
G.W. Reed
Inventor:
N. C. Sanford
per Munn & Co
attys.

UNITED STATES PATENT OFFICE.

N. C. SANFORD, OF MERIDEN, CONNECTICUT.

IMPROVEMENT IN AUGERS.

Specification forming part of Letters Patent No. 36,534, dated September 23, 1862.

*To all whom it may concern:*

Be it known that I, N. C. SANFORD, of Meriden, in the county of New Haven and State of Connecticut, have invented a new and useful Improvement in Augers; and I do hereby declare that the following is a full, clear, and exact description of the same, reference being had to the accompanying drawings, making a part of this specification, in which—

Figure 1 is an external view or a side view of an auger constructed according to my invention. Fig. 2 is an end view or a face view of the cutting-edge of the same; Fig. 3, an enlarged external view or side view of the same.

Similar letters of reference indicate corresponding parts in the several figures.

This invention relates to an improvement in augers, whereby the same are rendered capable of working or boring endwise of the grain of the wood with equally as great facility as an ordinary auger can work or bore crosswise of the grain.

The invention consists in providing the auger with supplemental lips or cutters formed on the end of the auger in such a manner that they will cut transversely of the grain and serve to feed the auger to its work.

The ordinary "screw-auger" (so called) cannot bore or work well endwise of the grain of the wood in consequence of not having a sufficient feed to keep it to its work. The small screw or spur cannot catch into the grain in an endwise direction of the same, and hence the operator while turning the auger is compelled to press it into the wood, which greatly increases the labor, and frequently causes the auger to be deflected from a direct or true course.

My invention, it is believed, fully obviates this difficulty. The auger is kept in proper position and a feed is obtained which will keep the auger to its work without any effort on the part of the operator.

To enable those skilled in the art to fully understand and construct my invention, I will proceed to describe it.

A represents the shank of the auger, and B the screw, which may be of the single or double form, or triple form, if necessary. The lower end of each flange *a* which forms the screw is provided with a cutting-lip, *b*, which extends from the spur or screw *c* at the center of the auger in a slightly-curved line, as shown in Fig. 2, and slightly inclined upward from a horizontal line, as shown in Figs. 1 and 3. The outer parts of the lips *b* extend upward in an inclined direction, as shown at 1, and then project vertically upward, as shown clearly at 2 in the enlarged view in Fig. 3.

Below the parts 1 2 of the cutting-lips *b* there are supplemental cutting-lips *d d*, which are of semicircular form and extend outward about flush with the outer edges of the flanges *a*, which form the screws of the auger, said lips *d* being on the bottoms of the flanges—that is to say, on the end or face of the auger—as shown in Fig. 2. The lips *d* are not in a horizontal plane or one which is at right angles with the screw or spur *c*. They are inclined, forming a spiral or part of a screw having a "pitch" corresponding with that of the small spur or screw *c*, as shown clearly in Figs. 1 and 3. The cutting-edges of the lips *d d* extend out flush with the outer vertical parts, 2, of the lips *d*, as shown in all the figures. When the auger is at work endwise with the grain of the wood, it will be seen that the supplemental lips or cutters *d d* will serve to feed the auger to its work, as they have a spiral position or pitch corresponding to that of the spur or screw *c*, and the lips or cutters *d* and lower parts of the lips or cutters *b* cut the grain of the wood transversely, the parts 1 2 of the lips or cutters *b* merely scooping or cleaning the wood from the side of the hole. The supplemental lips or cutters *d d* also perform another important function, to wit: They serve as bearings to keep the auger in proper position, preventing it from being deflected from a true course.

By having the parts 1 2 of the lips or cutters *b* in position with the lower parts thereof, as shown and described, obtuse angles are obtained, and a much easier cut than is produced by the right-angular lips in the ordinary auger.

Having thus described my invention, what I claim as new, and desire to secure by Letters Patent, is—

The supplemental lips or cutters *d d*, in combination with the lips or cutters *b* and spur or screw *c*, all constructed and arranged, substantially as shown, to form a new and improved implement or auger, for the purpose specified.

N. C. SANFORD.

Witnesses:
 A. H. CURTIS,
 LEVI E. COE.